United States Patent
Barsov et al.

Patent Number: 5,356,247
Date of Patent: Oct. 18, 1994

[54] CURVILINEAR PROFILE PARTS MACHINING METHOD

[75] Inventors: Alexandr A. Barsov; Anatoly A. Vdovin; Sergei L. Gavrilov; Valery A. Gorelov, all of Moscow; Sergei N. Dolgih, Pezm; Azkady A. Merkushev, Pezm; Eugene D. Mokzonosov, Pezm, all of Russian Federation

[73] Assignee: DCD, Ltd., Proezo, Russia

[21] Appl. No.: 88,743

[22] Filed: Jul. 8, 1993

[51] Int. Cl.$^5$ ............... B23C 3/00; B23B 1/00
[52] U.S. Cl. .................... 409/131; 82/1.11
[58] Field of Search ........... 409/131, 132; 82/1.11, 82/118; 364/474.15, 474.16, 474.02

[56] References Cited

U.S. PATENT DOCUMENTS 3,671,839  6/1972  Meyer et al. ............ 82/118 X

FOREIGN PATENT DOCUMENTS

| | | | |
|---|---|---|---|
| 1085673 | 4/1984 | U.S.S.R. | 82/1.11 |
| 1098674 | 6/1984 | U.S.S.R. | 82/1.11 |
| 1210994 | 2/1986 | U.S.S.R. | 409/132 |
| 1294484 | 3/1987 | U.S.S.R. | 409/132 |
| 1526913 | 12/1989 | U.S.S.R. | 82/1.11 |
| 1585080 | 8/1990 | U.S.S.R. | 82/1.11 |

*Primary Examiner*—William Briggs
*Attorney, Agent, or Firm*—Lieberman & Nowak

[57] ABSTRACT

A method for producing machined parts with curvilinear profiles allows for selection of the optimum rotational frequency of a part to be machined by analyzing wave process energy created by interaction of the machining instrument and the machined part while creating the curvilinear profile. During preliminary machining at several rotational frequencies, integral values of the wave process energy are determined and the relationship between these values and the rotational frequencies are identified. The optimum rotational frequency is then selected according to the minimum value of the aforementioned relationship. Increased accuracy in selecting the proper rotational frequency reduces wear of the machining (or cutting) instrument and produces higher quality machined parts in a reduced amount of time.

4 Claims, 1 Drawing Sheet

5,356,247

CURVILINEAR PROFILE PARTS MACHINING METHOD

The present invention relates to machine building technologies, and in particular, to improved methods of machining parts with curvilinear profiles. The present invention involves selection of optimum rotational frequency of a complex profile part during its machining.

A method of selecting parameters (such as rotational frequency) of the machining process is known in the prior art. For example, during experimentation spindle rotational frequency is determined according to the formula which relates the part's diameter to rotational frequency and cutting velocity (Metals Machining by Cutting. Reference Book of a Process Engineer. A. A. Panov. Moscow, Mashinostroenie, 1988, p. 64 1–651). However, this method does not provide for the selection of rotational frequency during the curvilinear profile parts machining, as it is intended for discrete values of profile diameters.

A parts machining method is known which provides for selection of optimum cutting velocity depending on variations in amplitude and intensity of wave parameters which characterize the interaction between instrument and a part. (USSR Author's Certificate No. 831532, MKU B230 15/00, 1979). In this method, optimum cutting velocity is selected by minimizing the relationship of wave energy values to cutting velocity which evolve from machining zone per unit of time per unit of cutting distance.

However, the familiar method does not provide for selection of optimum cutting velocity for parts with curvilinear profiles. During the machining of such parts with constant rotational frequency n, there is no unified value of optimum rotational frequency corresponding to optimum machining rate $V = \pi n D$ (where n=rotation frequency, D=part diameter) for all sections of the machined profile. This occurs because changes in machining velocity depend on diameter (cutting velocity is a function of the machined part diameter).

The present invention provides a method of machining parts with a curvilinear profile and allows selection of optimum (rational for the whole profile) rotational frequency of a part while minimizing wear of the cutting instrument.

DETAILED DESCRIPTION OF THE INVENTION

The present method of machining parts with curvilinear profile includes selection of optimum technological parameters in relationship to amplitude and intensity variations between the machinery instrument and a part. Preliminary machining of a part with curvilinear profile is conducted at several rotational frequencies of spindle. At every rotational frequency, the integral value of wave process energy is determined. The wave process is generated in the interaction zone of the instrument and a part during machining of the curvilinear surface. Then, relationships of integral values of wave processes' energies to rotational frequencies are identified, and the value of the machined part's optimum rotational frequency is selected based on the minimum value of the relationship taken.

Preferably, the energy value of wave process generated in the interaction zone of the instrument and a part in full contact during machining of the curvilinear surface is described by the following formula:

$$\beta = \int_0^t \frac{\overset{o}{A(t)N(t)}}{D(t)n} dt \quad (1)$$

where:

A = wave parameter amplitude;
N = wave parameter intensity;
D = current part;
t = current machining time;
n = rotational frequency.

It is expedient to use acoustic emission or electromagnetic emission parameters as wave parameters.

A basis of the present method lies in implementation of a novel mathematical criterium based on physical phenomena taking place in the interaction zone of instrument and a part. The integral energy value of wave process generated in the interaction zone of the instrument and a part in the course of machining the curvilinear surface of a part in full time period of contact between them (i.e., at the whole travel distance of instrument) which characterizes the intensity of instrument wear is used as the specified criterium. By calculating the value of the specified wave criterium at several rotational frequencies and minimizing the relationship gained of criterium variance to rotational frequency, the value of optimum (i.e, rational for the whole profile) rotational frequency providing the minimum intensity of instrument wear is determined. It is expedient to use equation (1) as a numerical expression for the determination of integral energy value of wave process generated in the interaction zone.

Since for parts of the same diameter, optimum velocity V can be gained by minimizing the relationship of wave energy values being evolved from the machining zone per unit of cutting distance to cutting velocity, i.e., criterium $$W = \frac{\overset{o}{A \cdot N}}{V}$$

takes place, it is possible to specify a rational rotational frequency n for parts with an entirely curvilinear profile. From the fact that $V = \pi n D$, criterium $\beta$ will be determined according to the following relationship:

$$\beta = \int_0^t \frac{\overset{o}{A(t)N(t)}}{D(t)n} dt$$

Figure 1:
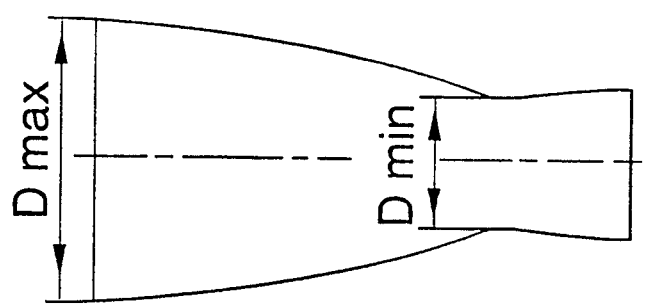
FIG. 1 illustrates the curvilinear profile of a given part to be machined where $D_{min}$ and $D_{max}$ are the minimum and maximum profile diameters of the part.
Figure 2A:
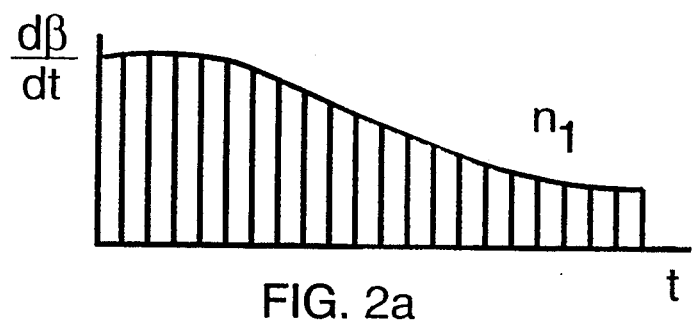
FIGS. 2a, 2b and 2c illustrate the relationship of parameter $d\beta/dt$ to machining time of a specific profile under a given machining rate at several specified spindle rotational frequencies ($n_1, n_2, \ldots n_k$).
Figure 2B:
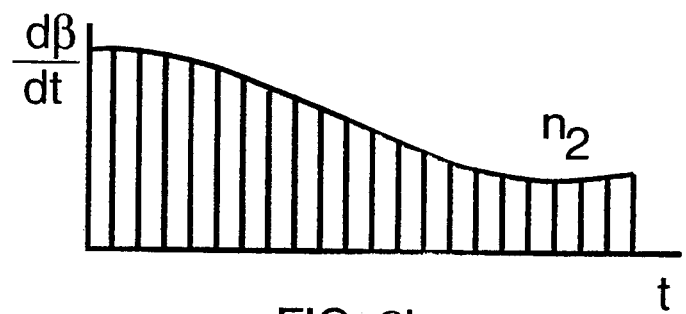
Figure 2C:
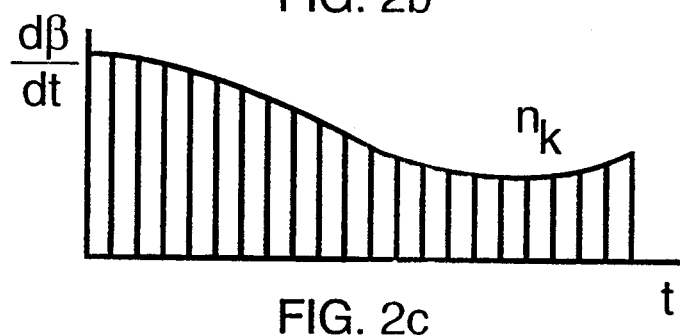
Figure 3:
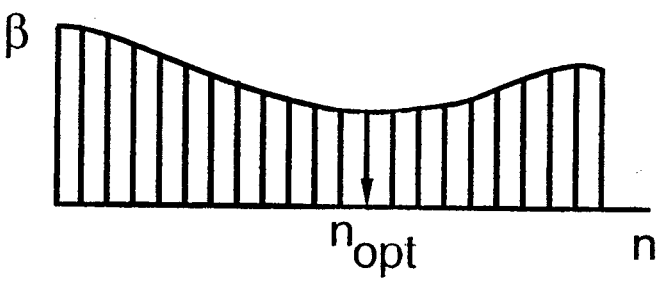
FIG. 3 illustrates the relationship of wave process energy value ($\beta$) to spindle rotational frequency.

The present method is explained by the drawing in FIG. 1. A part with curvilinear profile where $D_{min}$ and $D_{max}$—correspondingly the least and the greatest profile diameters is illustrated. FIGS. 2A–2C illustrate relationships of parameter $$\frac{d\beta}{dt} = \frac{A(t)N(t)}{D(t)n}$$

to profile machining time under given feed of instrument and at several values of spindle rotational frequency: $n_1, n_2, \ldots n_k$. FIG. 3 illustrates the relationship of parameter $\beta$ to spindle rotational frequency.

From the above discussed theoretical explanation, the present method can be implemented in the following way. A given real part profile is machined on test pieces at several spindle rotation frequencies. The specified values of rotational frequencies may be selected from the range:

$$\frac{1000V_0}{\pi D_{max}} K^{-1} \ldots \frac{1000V_0}{\pi D_{min}} K^*$$

where:

$V_o$ = rational cutting velocity for given material;

$D_{min}$ and $D_{max}$ = correspondingly the smallest and the largest profile diameters;

$K = 1.5$.

During machining of a part at every frequency, wave processes' parameters, i.e., acoustic emission amplitude and intensity are registered. The relationship of parameter $d\beta/dt$ to profile machining time are determined (FIG. 2) for every rotational frequency. They are then integrated and the relationship of integral energy values of wave processes, i.e, criterium $\beta$ to rotational frequency is identified (FIG. 3 ). The optimum rotational frequency of part's machining corresponds to the frequency value that corresponds to the minimum value of the relationship taken.

EXAMPLE

The spindle rotational frequency for machining the curvilinear profile of a part in one pass is selected. Part's material is 20×13, cutting blade material—T15K6. Specified values: stock for a pass—1 mm; feed—0.15 mm/R, rational cutting (machining) velocity $V_o = 111$ m/min, $D_{max}$—85 mm, $D_{min}$—40 mm. The rotational frequency range is determined to be 277–1325 R.P.M. The machining is conducted with tool 16K20 3C32 and an acoustic emission converter is mounted onto cutting instrument. The converter is connected with stress wave analyzer ABH-1M and registering device H338-6. After rough machining, passes are conducted for test pieces along given curvilinear profile with rotational frequencies specified in Table 1.

TABLE 1

| Test Piece NN | 1 | 2 | 3 | 4 | 5 | 6 | 7 | 8 |
|---|---|---|---|---|---|---|---|---|
| Rotational Frequency | 280 | 430 | 580 | 730 | 880 | 1030 | 1180 | 1330 |
| $\beta$ Values in Per-Unit | 50 | 40 | 32 | 26 | 24 | 35 | 48 | 64 |

The relationships gained are integrated on taking the value of criterium $\beta$ (Table 1). Value $n_o = 770$ R.P.M. is selected (FIG. 3).

If electromagnetic emission parameters are used as wave parameters, the reading of primary information and its processing are carried out along similar lines with usage of relevant equipment.

The advantage of the present method lies in its speed, as it reduces the time needed to search for optimum rotational frequencies for parts of any diameter. The method allows selection of the rational rotational frequency as it deals with real curvilinear profile tests. The increased accuracy of rational rotational frequency selection reduces cutting instrument wear and allows for high-quality manufacture of parts with shaped profile, and reduces the time required to manufacture new products.

What is claimed is:

1. A curvilinear profile part machining method which comprises:
   (a) conducting a plurality of rotations of a spindle during preliminary machining of a part at various preselected rotational frequencies;
   (b) determining the integral value of wave process energies for the preselected frequencies;
   (c) correlating the integral values of the wave process energies to the rotational frequencies;
   (d) selecting the rotational frequency corresponding to the minimum ratio of wave process energy to rotational frequency;
   (e) rotating the part at or about the selected rotational frequency.

2. A method of claim 1, wherein the integral value of the wave process energy is calculated by the following equation:

$$\beta = \int_0^t \frac{A(t)N(t)}{D(t)n} dt$$

where:

A = wave parameter amplitude;
N = wave parameter intensity;
D = current part diameter;
t = current machining time;
n = rotation frequency.

3. A method of claim 1, wherein acoustic emission parameters are used as wave parameters.

4. A method of claim 1, wherein electromagnetic emission parameters are used as wave parameters.

* * * * *